(No Model.)
O. S. CRANE.
FEATHER RENOVATOR.
No. 320,540. Patented June 23, 1885.
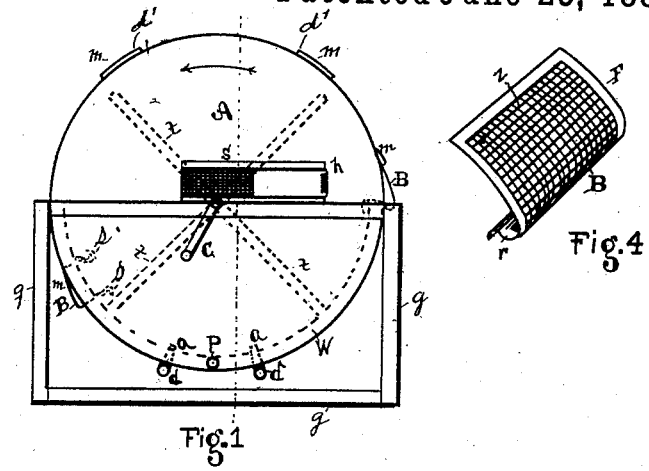
Fig. 1
Fig. 4
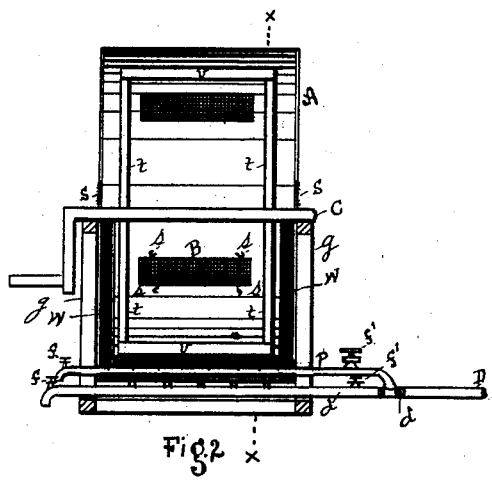
Fig. 2
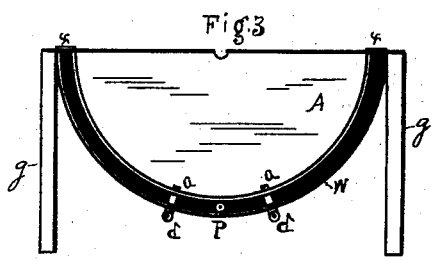
Fig. 3
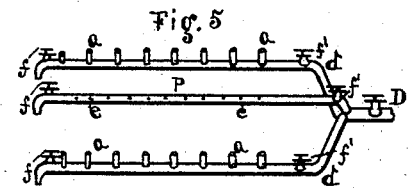
Fig. 5
ATTEST
E. J. Stoddard
Edward Winslow Geer
INVENTOR
Orrie S. Crane
Per Roscoe B. Wheeler
Atty

UNITED STATES PATENT OFFICE.

ORRIS S. CRANE, OF DETROIT, MICHIGAN.

FEATHER-RENOVATOR.

SPECIFICATION forming part of Letters Patent No. 320,540, dated June 23, 1885.

Application filed September 8, 1884. (No model.)

*To all whom it may concern:*

Be it known that I, ORRIS S. CRANE, a citizen of the United States, residing at Detroit, in the county of Wayne and State of Michigan, have invented certain new and useful Improvements in Feather-Renovators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my present invention is to construct a simple and cheap device for the purpose of cleaning and drying or renovating feathers; and my invention consists in providing the cylinder or renovator drum with wire-screening pockets, as hereinafter set forth; also, in the arrangement or system of conveying live steam into said renovator, in connection with a steam or heating chamber for drying the feathers when cleaned, as and for the purposes hereinafter specified.

In the drawings forming a part of this specification, Figure 1 is a front elevation of my invention. Fig. 2 is a transverse section through Fig. 1 on vertical dotted lines. Fig. 3 is a longitudinal section through Fig. 1 below the center of the drum. Fig. 4 is an enlarged perspective of one of the metal screening-frames. Fig. 5 is a perspective of the steaming and heating pipes detached from the drum.

In the drawings, Fig. 1, *g* represents a framework, to which I attach the cylinder or renovating drum A. Said drum is made entirely of sheet metal, being in two sections. The top section consists of a single shell, (see Figs. 1 and 2,) while the bottom is made double, consisting of two like shells, one within the other. The inner shell is made considerably smaller, thus forming the chamber W, which extends around the lower portion of the drum and upon each side, as shown in Figs. 2 and 3. The chamber W at the top is closed over at *x x*. (See Fig. 3.) The upper half of the drum is of the same size as the outer lower half, as shown in Figs. 1 and 2.

Passing through the center of the drum is a crank-shaft, C, having arms *t t*. Upon the outer ends of said arms are fans or beaters *v v*. The wall of the upper portion of the drum has three doors or openings, *m m m*, and the lower portion one. The drum A is built stationary, and the beaters *v v* are revolved by means of a crank or pulley upon the shaft C.

I locate in the bottom of the drum A a series of steam-pipes, *d, d* and P, which are connected to a main pipe, D, which leads to the steam-supply. The pipes located in the lower section of the drum extend from side to side. The pipes *d d* are below the outer wall of the drum, while the central pipe passes through the heads or sides of the drum and through the chamber W. Said pipe in the chamber is provided with perforations *e e*, (see Figs. 2 and 5,) and the pipes *d d* are each provided with a series of tubes, *a a*, leading into said pipes and extending through the chamber W, projecting slightly above the inner wall of the lower section of the drum. (See Figs. 1 and 5.) The pipes *d d* and P are provided with steam-valves *f' f' f'*, having at their free ends, which extend through to the opposite side of said drum, steam-cocks *f f f*. (See Figs. 2 and 5.) Above the shaft C, on each side of the drum, is an air-opening, which is covered by a screen, S, and said openings are also provided with sliding doors *h*.

The screw B, as shown in Fig. 4, consists of a metal frame, F, curved in its vertical part and turned upward at the bottom in the form of a U, forming the pocket *r*. (See Fig. 4.) Said frame is covered by a wire-cloth, *z*.

To operate said machine, the feathers are placed within the machine, through the upper doors of the drum. The screens over the openings are all removed, and said openings are closed by metal doors *d' d'*. The steam from the supply-pipe D is let on when the steam-valves of the pipes *d d* are opened, the cocks *f* being closed. The steam passes up through the series of tubes *e e* into the renovator-drum through the feathers. When turning the beaters by the crank, the feathers are driven around the drum, thus cleaning and purifying them. When the feathers have been sufficiently steamed, the valves of the steam-pipes *d d* are closed and the cocks *f* are opened. Then, opening the doors of the drum A, the screen-frames are inserted over said openings, and the slides *h* are drawn back, as shown in Fig. 1, which admits air at the center of the drum.

Then, opening the steam-valve of the pipe P, live steam will be admitted into the heating-chamber W below the feathers. The steam in said chamber heats the drum, and turning the beaters, as before stated, driving the feathers around the drum, when the moisture and light impurities will pass out through the screened openings, and as the feathers are thrown around the drum, stones, nails, sticks, and all heavy foul matter that may be in the feathers in dropping back fall against the screens B B and lodge within the pockets $r$, thus separating said foul matter from the feathers. To empty or remove the screens B B, they are slighty raised, when they may be drawn forward out of the drum. When the feathers are thoroughly dried, the feather-tick is caught over the hooks $s\ s$ in the screen-opening in the lower section of the drum by first removing the screen B, when the feathers are blown into said tick by the turning of the beaters, as hereinbefore stated.

Having thus fully described my present invention, what I claim as new, and desire to secure by Letters Patent, is—

1. In a feather-renovator, the drum, made of sheet metal and mounted upon a suitable frame, in combination with the screening-frame F, having the wire-covering $z$ and pocket $r$, formed in said screen, and a revolving beater within said drum, substantially as set forth.

2. In a feather-renovator, the drum A, made in two parts, the lower part having the heating-chamber W, and series of pipes $d\ d$ and P, arranged in the lower section of said drum, substantially as specified, of a revolving beater within said drum, the screens $s$ and sliding doors $h$, and the screens B, having pockets $r$, when arranged and combined substantially as set forth.

In testimony whereof I affix my signature in presence of two witnesses.

ORRIS S. CRANE.

Witnesses:
E. S. WHEELER,
R. B. WHEELER.